United States Patent
Bussiere et al.

(10) Patent No.: US 9,476,471 B2
(45) Date of Patent: Oct. 25, 2016

(54) BRAKING ACTUATOR FOR A HYDRAULIC BRAKE OF AN AIRCRAFT WHEEL

(71) Applicant: MESSIER-BUGATTI-DOWTY, Velizy Villacoublay (FR)

(72) Inventors: Jacques Bussiere, Velizy-Villacoublay (FR); Vincent Gonzalez, Velizy-Villacoublay (FR); Marie-Laure De Crescenzo, Velizy-Villacoublay (FR)

(73) Assignee: MESSIER-BUGATTI-DOWTY, Velizy-Villacoublay (FR)

( * ) Notice: Subject to any disclaimer, the term of this patent is extended or adjusted under 35 U.S.C. 154(b) by 22 days.

(21) Appl. No.: 14/529,320

(22) Filed: Oct. 31, 2014

(65) Prior Publication Data

US 2015/0122595 A1 May 7, 2015

(30) Foreign Application Priority Data

Nov. 4, 2013 (FR) ...................................... 13 60792

(51) Int. Cl.
*F16D 65/54* (2006.01)
*F16D 55/40* (2006.01)
*F16D 65/18* (2006.01)
(Continued)

(52) U.S. Cl.
CPC ............. *F16D 65/543* (2013.01); *B64C 25/44* (2013.01); *F16D 55/24* (2013.01); *F16D 55/40* (2013.01); *F16D 65/186* (2013.01); *F16D 65/54* (2013.01);
(Continued)

(58) Field of Classification Search
CPC .... F16D 65/54; F16D 65/543; F16D 65/186; F16D 55/24; F16D 55/40; F16D 25/44; F16D 2121/02; F16D 2121/04; F16D 2055/0058

USPC ................................................. 188/71.8, 72.4
See application file for complete search history.

(56) References Cited

U.S. PATENT DOCUMENTS 3,542,165 A * 11/1970 Lucien .................... F16D 65/54
                                                          188/196 P
3,729,072 A * 4/1973 Borkowski ........... F16D 65/543
                                                          188/196 P (Continued)

FOREIGN PATENT DOCUMENTS

WO         2005/019679 A1       3/2005

OTHER PUBLICATIONS

French Search Report for French Patent Application No. 13 60792, dated Jul. 1, 2014.

(Continued)

*Primary Examiner* — Thomas Irvin
(74) *Attorney, Agent, or Firm* — Sughrue Mion, PLLC

(57) ABSTRACT

A braking actuator for a hydraulic aircraft brake, received in a cavity of a ring of the brake. The actuator comprises a liner structure (1) sealed in the cavity of the ring, and a piston (3) slidably mounted in the liner structure to apply a braking force. A wear-compensating device (10) defines a retreated position of the piston in the liner structure by an axially movable stop (11) which can be advanced by the piston during the application of a braking force and in frictional relationship with a fixed part (18) of the wear-compensating device secured to the liner. An elastic member (24) returns the piston to the retreated position defined by the piston bearing against the movable stop, the movable stop being in frictional relationship with the fixed part via at least one telescopic intermediate element (16) interposed between the movable stop (11) and the fixed part (18).

13 Claims, 3 Drawing Sheets

(51) Int. Cl.
*B64C 25/44* (2006.01)
*F16D 55/24* (2006.01)
*F16D 55/00* (2006.01)
*F16D 121/02* (2012.01)
*F16D 121/04* (2012.01)

(52) U.S. Cl.
CPC ... *F16D 2055/0058* (2013.01); *F16D 2121/02* (2013.01); *F16D 2121/04* (2013.01)

(56) References Cited

U.S. PATENT DOCUMENTS

| | | | | |
|---|---|---|---|---|
| 3,887,047 A * | 6/1975 | Harnish | F16D 65/543 | 188/196 R |
| 3,903,999 A * | 9/1975 | Ditlinger | F16D 55/40 | 188/196 R |
| 3,957,146 A * | 5/1976 | Le Blanc | F16D 13/75 | 188/196 P |
| 3,958,670 A * | 5/1976 | Anderson | F16D 55/40 | 188/196 R |
| 3,990,547 A * | 11/1976 | Plaat | F16D 65/543 | 188/196 R |
| 4,006,669 A * | 2/1977 | Price | F16D 55/40 | 188/196 R |
| 4,171,036 A * | 10/1979 | Plaat | F16D 65/543 | 188/196 P |
| 4,180,147 A * | 12/1979 | Tjarksen | F16D 65/543 | 188/196 P |
| 4,186,825 A * | 2/1980 | Milliken | F16D 65/543 | 188/196 R |
| 4,192,407 A * | 3/1980 | Crossman | F16D 65/543 | 188/196 R |
| 4,214,650 A * | 7/1980 | Crossman | F16D 65/543 | 188/196 R |
| 4,449,616 A * | 5/1984 | Musser, Jr. | F16D 65/543 | 188/196 R |
| 4,503,950 A * | 3/1985 | Anderson | F16D 65/543 | 188/196 R |
| 4,751,985 A * | 6/1988 | Chambers | F16D 55/40 | 188/196 P |
| 4,815,359 A * | 3/1989 | Black | F16D 55/40 | 188/196 P |
| 5,154,262 A * | 10/1992 | Berwanger | F16D 65/543 | 188/196 R |
| 5,209,154 A * | 5/1993 | Black | F16D 65/18 | 91/517 |
| 5,219,046 A * | 6/1993 | Clark | F16D 55/40 | 188/196 P |
| 5,355,774 A * | 10/1994 | Ditlinger | F16D 65/18 | 403/316 |
| 5,542,504 A * | 8/1996 | Berwanger | F16D 65/543 | 188/71.8 |
| 6,016,892 A * | 1/2000 | Berwanger | F16D 65/18 | 188/71.8 |
| 6,234,279 B1 * | 5/2001 | Jankowski | F16D 65/543 | 188/196 P |
| 6,684,983 B1 * | 2/2004 | Pajot | F16D 65/543 | 188/196 P |
| 7,344,006 B2 * | 3/2008 | Edmisten | F16D 65/36 | 188/206 R |
| 2006/0272904 A1 * | 12/2006 | Soellner | F16D 55/40 | 188/71.7 |
| 2015/0275992 A1 * | 10/2015 | Gonzales | F16D 65/58 | 188/71.8 |

OTHER PUBLICATIONS

Form FR237 for French Patent Application No. 13 60792, dated Jul. 1, 2014.

* cited by examiner

BRAKING ACTUATOR FOR A HYDRAULIC BRAKE OF AN AIRCRAFT WHEEL

CROSS-REFERENCE TO RELATED APPLICATION

This application relates to and claims the benefit of priority from French Patent Application number 13 60792, filed on Nov. 4, 2013, the entire disclosure of which is incorporated herein by reference.

TECHNOLOGICAL BACKGROUND OF THE INVENTION

Hydraulic brakes used to brake the wheels of aircraft generally comprise a ring having multiple cavities in which braking actuators are attached in a removable manner. Each of the actuators comprises a liner which is attached in a sealed manner in one of the cavities of the ring and in which a piston is slidably mounted in a sealed manner along a sliding axis. The ring distributes pressurized hydraulic fluid to all its cavities, which fluid acts on the piston in order to extend it and to apply a braking force on friction elements extending facing the ring, including rotors which turn with the wheel, and stators which are rotationally immobile.

The piston generally has an operational travel which it covers during the application of a braking force. This operational travel, of the order of a few millimeters, is sufficient to allow the application of the braking force on the friction elements and to allow the push rod to retreat so as to permit the free rotation of the rotors. For this purpose, a spring extending within the piston ensures that the push rod is retreated to a retreated position when the braking force is no longer applied.

However, since the friction elements wear progressively subsequent to the repeated application of braking forces, it is important to ensure that the piston is always situated close to the friction elements. To achieve this, it is known practice to equip the braking actuators with a wear-compensating device which extends inside the piston. The wear-compensating device comprises a movable stop which is slidably mounted with friction along the sliding axis on a central rod which extends in the piston and which defines the retreated position of the piston.

During the application of a braking force, the piston is pushed towards the friction elements and, where appropriate, drives the movable stop with it while overcoming the friction between the rod and the stop, thereby causing the movable stop to be advanced on the rod. When the force is released, the spring, which extends between the movable stop and the piston, causes the piston to be retreated to the new retreated position, which has advanced owing to the advancement of the movable stop.

The friction can be organised by various means, such as, for example, the interposition of friction rings between the stop and the central rod, or else the interposition of a deformable sleeve co-operating with an olive which radially deforms the sleeve on each advancement of the movable stop.

There are essentially two technologies for this type of braking actuator, in one of them, termed wet piston, the hydraulic fluid is admitted inside the piston and immerses the wear-compensating system. These actuators are simple, but have the disadvantage that the fluid extends in zones close to the end of the piston which is subjected to high temperatures owing to the heating by friction of the friction elements of the brake. This results in a partial alteration of the physico-chemical characteristics of the hydraulic fluid, which may degrade the braking performance in the long term.

In the other of the technologies, termed dry piston, a seal is interposed between the piston and the central rod, with the result that the fluid remains confined at the rear of the piston and no longer immerses the wear device. However, such a technology requires the use of an additional seal which poses other wear problems in use.

OBJECT OF THE INVENTION

The object of the invention is to provide a braking actuator for a hydraulic aircraft brake which does not have the aforementioned disadvantages.

SUMMARY OF THE INVENTION

In order to achieve the same, there is proposed a braking actuator for a hydraulic aircraft brake, intended to be received in one of the cavities of a ring of the brake, the actuator comprising
- a liner adapted to be received in a sealed manner in the cavity of the ring;
- a piston slidably mounted in a sealed manner in the liner along a sliding axis in order to apply a braking force when a pressurized fluid is introduced into the cavity;
- a wear-compensating device which defines a retreated position of the piston in the liner by means of an axially movable stop which can be advanced by the piston during the application of a braking force and in frictional relationship with a fixed part of the wear-compensating device secured to the liner;
- an elastic member for returning the piston to the retreated position bearing against the movable stop;
- in which, according to the invention, the movable stop is in frictional relationship with the fixed part via at least one telescopic element interposed between the movable stop and the fixed part.

By virtue of the telescopic element, the wear-compensating mechanism is more compact. The piston can then be equipped, beyond the wear-compensating mechanism, with a wall which confines the hydraulic fluid and prevents it from extending at the distal end of the piston, being subjected to the heat flows originating from the friction elements.

BRIEF DESCRIPTION OF THE FIGURES

The invention will be better understood in the light of the following description with reference to the figures of the appended drawings, in which.

DETAILED DESCRIPTION OF THE INVENTION

Figure 1:
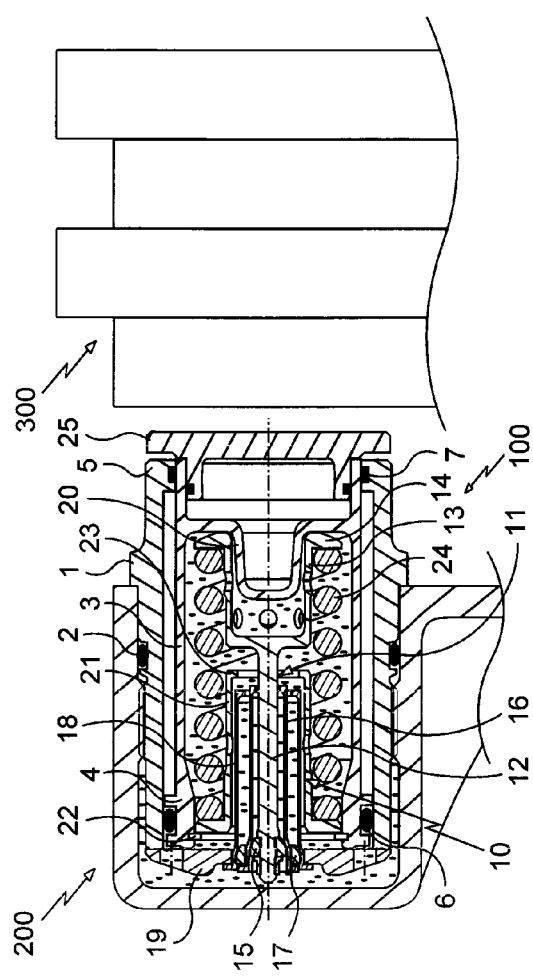
FIG. 1 is a view in section of a braking actuator according to the invention illustrated in place in a ring of a hydraulic aircraft brake.

With reference to FIG. 1, the braking actuator 100 of the invention is intended to be received in one of the cavities 200 of a ring of a hydraulic aircraft brake, moreover comprising friction elements 300 comprising a succession of rotor discs and stator discs, for example carbon discs, on which the actuator selectively exerts a braking force during the admission of pressurized fluid (illustrated by dots) into the cavity 200.

The actuator 100 first of all comprises a generally cylindrical liner 1 which is received in a sealed manner in the cavity 200 of the ring. For this purpose, a seal 2 cooperates with an outer face of the liner in order to contain the hydraulic fluid in the cavity.

A piston 3 is mounted to slide in the liner 1 along a sliding axis X. For this purpose, the proximal end 4 of the piston 3 is configured as a bearing which extends fittingly against an inner face of the liner 1. The distal end 5 of the liner 1 is configured as a bearing to guide the piston 3. The proximal end 4 of the piston 1 is provided with a seal 6, while the distal end 5 of the liner 1 is provided with a scraper 7.

The actuator 100 is provided with a wear-compensating device 10 which comprises a movable stop 11 which here comprises a central rod 12 extended by a bell 13 terminating in a step 14. The end of the central rod 12 bears an olive 15 with a spherical outer surface which cooperates with a first deformable sleeve 16 which extends around the central rod 12. The olive 15 has a diameter which is greater than an inside diameter of the first deformable sleeve 16, with the result that the movement of the olive 15 in the first deformable sleeve 16 causes the radial deformation of the first deformable sleeve, thereby generating a friction force sufficient to retain the first sleeve in position in the absence of external stress. The first deformable sleeve 16 also bears an olive 17 which cooperates with a second deformable sleeve 18 which extends around the first deformable sleeve 16 and which is secured to a base 19 attached to the proximal end of the liner 1. The second deformable sleeve 18 is therefore fixed relative to the liner 1.

The first deformable sleeve 16 therefore forms a telescopic intermediate element of the wear-compensating device. As can be seen, the assembly is particularly compact and makes it possible to equip the piston 3 with a sealed wall 20 which prevents the fluid from extending close to a shoe 25 borne by the distal end of the piston 3.

Moreover, the piston 3 is equipped with an inner cage 21 which is secured on the piston 3 by means of a securing ring 22 and which terminates in a rim 23 which extends with a clearance corresponding to the operational travel of the piston 3 facing the bell 13 of the movable stop 11. A spring 24 extends between the step 14 of the movable stop 11 and an end wall of the cage 21.

In the rest situation, the spring 24 pushes the piston 3 to the retreated position illustrated in FIG. 1, defined by the bearing of the sealed wall 20 against the movable stop 11.

Figure 2:
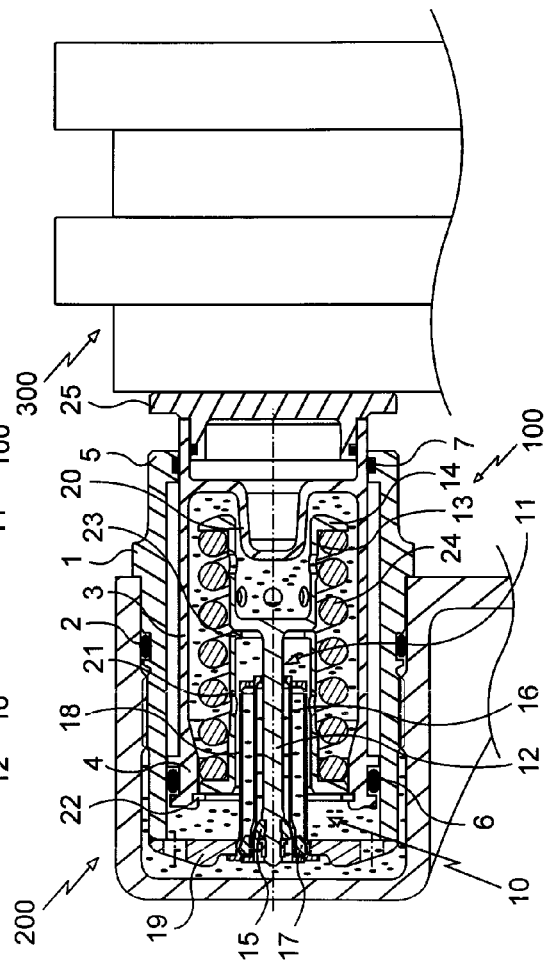
FIG. 2 is a figure analogous to FIG. 1, the actuator being illustrated during the application of a braking force.

The operation of the braking actuator of the invention is as follows. Starting from the retreated position illustrated in FIG. 1, a braking force is applied by admitting pressurized fluid into the cavity 200. The fluid pushes the piston 3 towards the discs 300. If, before touching the discs 300, the rim of the cage 21 butts against the bell 13 of the movable stop 11, the latter is advanced by the piston 3 against the friction generated by the radial deformation imposed by the olive 15 of the movable stop on the first deformable sleeve 16, until there is contact between the piston 3 and the discs 300, as illustrated in FIG. 2.

Figure 3:
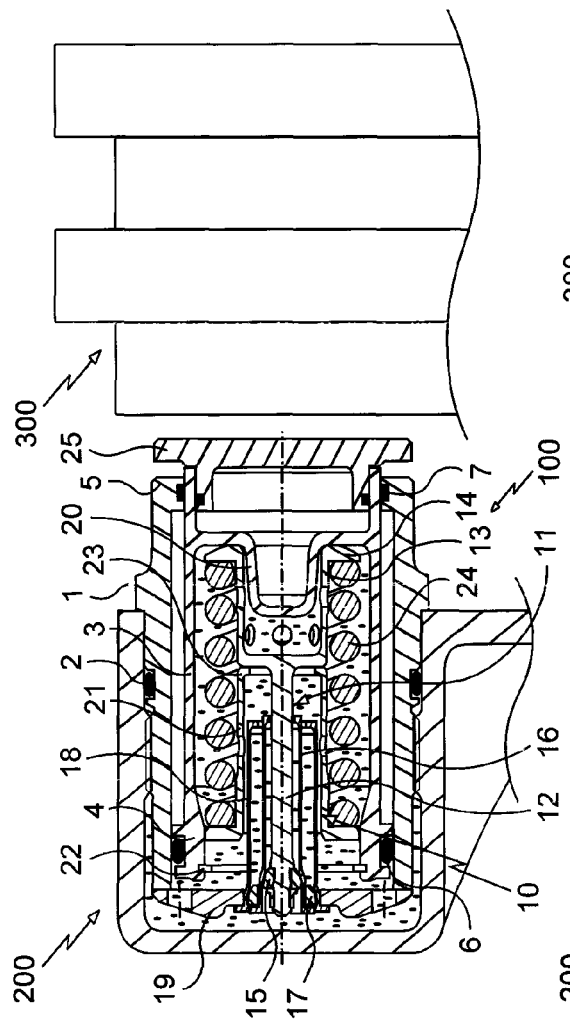
FIG. 3 is a figure analogous to FIG. 2, the actuator being illustrated after the braking force has been released.

Then, when the braking force is released, the piston returns under the effect of the spring 24 until the sealed wall 20 bears against the movable stop 11, thus defining a new retreated position, advanced with respect to the preceding one, as illustrated in FIG. 3. The operational travel of the piston (between the position of FIG. 2 and the position of FIG. 3) is unchanged, only the retreated position having slightly advanced in order to compensate for the wear of the discs 300.

Figure 4:
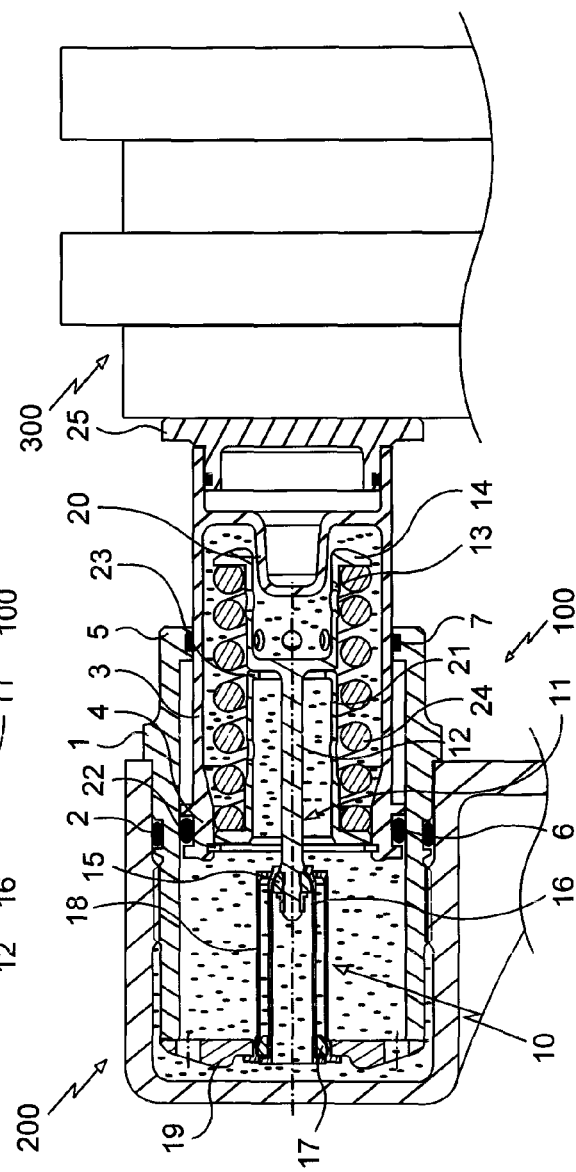
FIG. 4 is a figure analogous to FIG. 1, the movable stop having advanced by substantially half of its travel.
Figure 5:
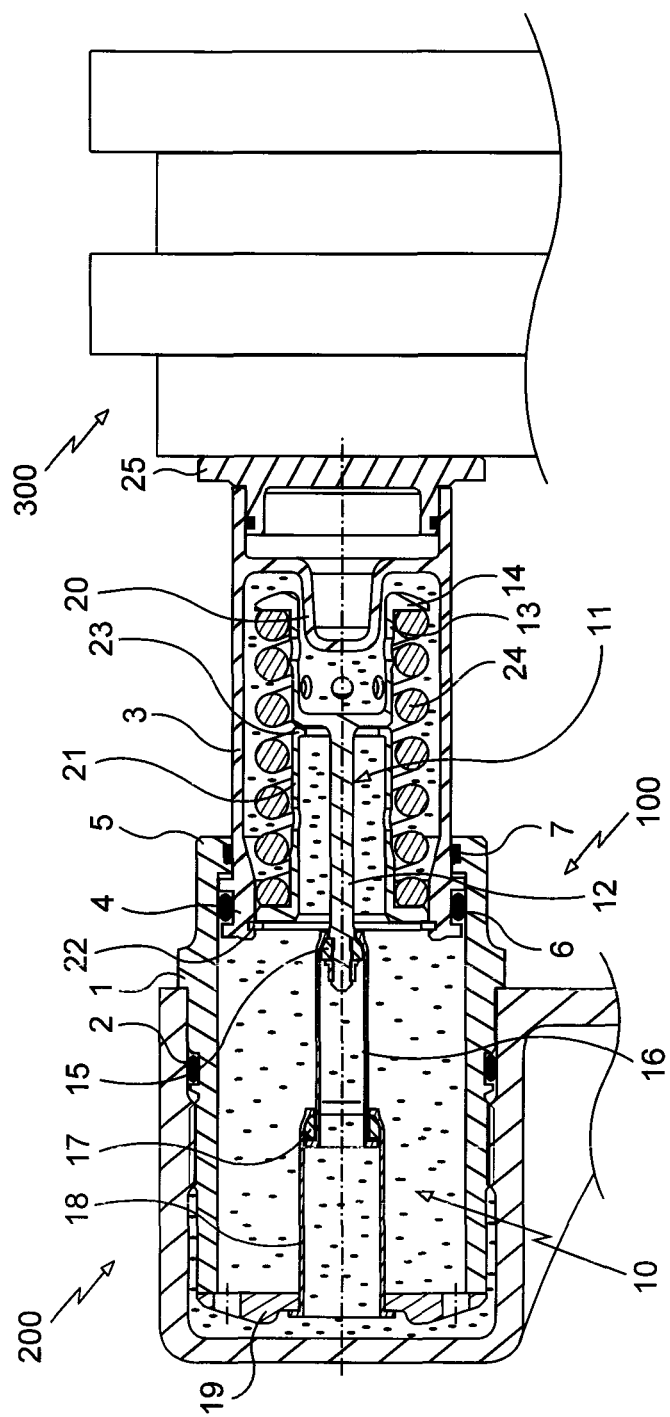
FIG. 5 is a figure analogous to FIG. 4, the movable stop having advanced by the whole of its travel.

During the life of the brakes, the wear of the discs will be sufficiently large for the movable stop 11 to have advanced to the point that the olive 15 of the movable stop 11 butts against an end step of the first deformable sleeve 16, as illustrated in FIG. 4. Consequently, the first sleeve 16 will be driven with the movable stop in its progressive advancement, the friction now being obtained by deformation of the second deformable sleeve 18, which is fixed, by the olive 17 secured to the first deformable sleeve 16 which moves with the movable stop 11, until the point of maximum advancement illustrated in FIG. 5.

In this situation, it is then necessary to recondition the actuator by replacing the two sleeves which have been deformed, and by reinitialising the piston in the liner. Of course, the order of deformation of the two sleeves depends on their relative stiffnesses. If, in contrast to what has been assumed here, the deformation of the first deformable sleeve 16 is more difficult than that of the second deformable sleeve 18, then the first deformable sleeve 16 will move first following the piston 3. It is only after that the piston will move relative to the first deformable sleeve.

If the deformations are of equal intensity, the two relative movements (first deformable sleeve 16/second deformable sleeve 18 and piston 3/first deformable sleeve 16) will certainly take place simultaneously.

The invention is not limited to what has been described but, on the contrary, encompasses any variants coming within the scope defined by the claims.

In particular, although the friction between the fixed part of the wear-compensating device (the second sleeve 18) and the intermediate element (the first deformable sleeve), on the one hand, and between the intermediate element and the movable stop, on the other hand, are here obtained by radial deformation, it will of course be possible to use any other means for obtaining this friction force suitable for arresting the movable stop, such as, for example, friction rings.

The invention claimed is:

1. A braking actuator for a hydraulic aircraft brake, intended to be received in one of the cavities of a ring of the brake, the actuator comprising
   a liner (1) adapted to be received in a sealed manner in the cavity of the ring;
   a piston (3) slidably mounted in a sealed manner in the liner along a sliding axis in order to apply a braking force when a pressurized fluid is introduced into the cavity;
   a wear-compensating device (10) which defines a retreated position of the piston in the liner by means of an axially movable stop (11) which can be advanced by the piston during the application of a braking force and in frictional relationship with a fixed part (18) of the wear-compensating device secured to the liner;
   an elastic member (24) for returning the piston to the retreated position defined by the piston bearing against the movable stop;
   wherein the movable stop is in frictional relationship with the fixed part via at least one telescopic intermediate element (16) interposed between the movable stop (11) and the fixed part (18), and
   wherein the intermediate element of the wear-compensating device comprises a first radially deformable sleeve (16), the deformation being obtained by cooperation of the first sleeve with an olive (15) secured to the movable stop.

2. The braking actuator according to claim 1, in which the fixed part of the wear-compensating device comprises a second radially deformable sleeve (16), the deformation being obtained by cooperation of the second sleeve with an olive (17) secured to the first sleeve.

3. A hydraulic brake for an aircraft wheel, comprising at least one braking actuator according to claim 2.

4. The braking actuator according to claim 1, in which the piston (3) is equipped with an inner cage (21) forming a bearing for the elastic member.

5. The braking actuator according to claim 4, in which the cage (21) terminates in a rim (23) which bears against the movable stop (11) during the application of a braking force.

6. A hydraulic brake for an aircraft wheel, comprising at least one braking actuator according to claim 5.

7. A hydraulic brake for an aircraft wheel, comprising at least one braking actuator according to claim 4.

8. A hydraulic brake for an aircraft wheel, comprising at least one braking actuator according to claim 1.

9. The braking actuator according to claim 1, in which the piston has a closed and fluid-tight distal end (4).

10. A hydraulic brake for an aircraft wheel, comprising at least one braking actuator according to claim 9.

11. The braking actuator according to claim 1, in which the liner has a distal end (5) which defines a guide bearing for the piston and which bears a scraper (7).

12. A hydraulic brake for an aircraft wheel, comprising at least one braking actuator according to claim 11.

13. A hydraulic brake for an aircraft wheel, comprising at least one braking actuator according to claim 1.

\* \* \* \* \*